S. O. JOHNS.
DEVICE FOR MEASURING OUT WATER.
APPLICATION FILED AUG. 4, 1919.
1,407,752.
Patented Feb. 28, 1922.
3 SHEETS—SHEET 1.
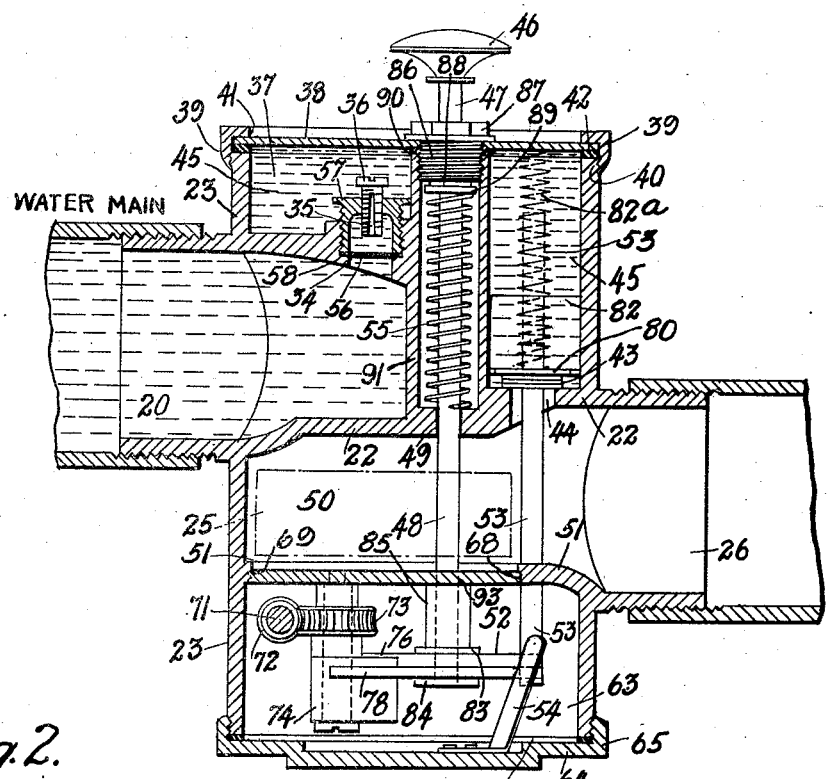
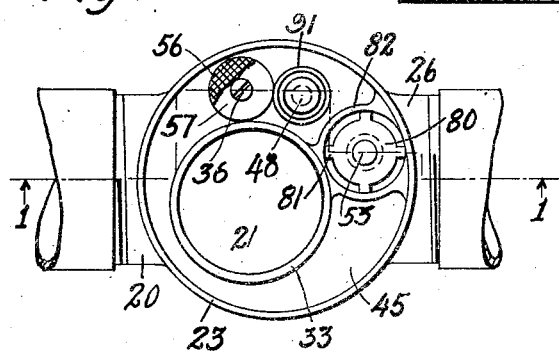
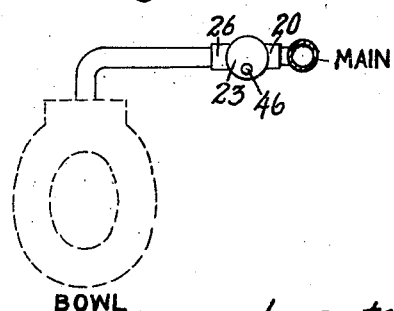
Inventor:
Stuart Otto Johns
by B.C. Stickney
Attorney S. O. JOHNS.
DEVICE FOR MEASURING OUT WATER.
APPLICATION FILED AUG. 4, 1919.
1,407,752.
Patented Feb. 28, 1922.
3 SHEETS—SHEET 2.
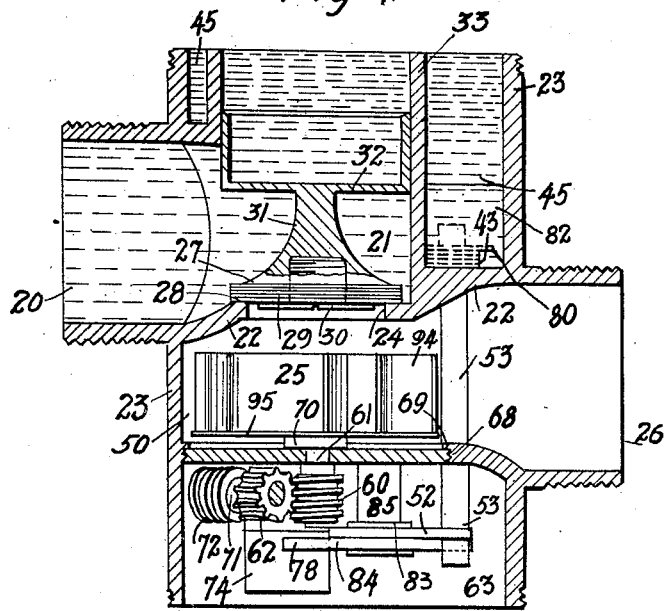
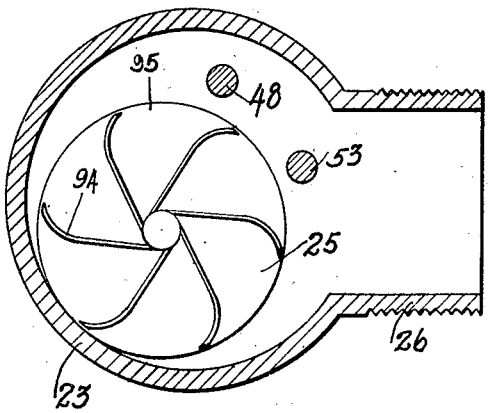
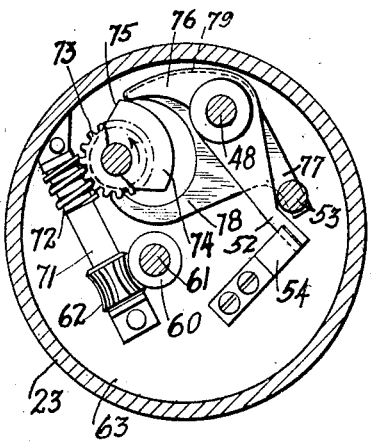
Inventor:
Stuart Otto Johns
by O. C. Stickney
Attorney S. O. JOHNS.
DEVICE FOR MEASURING OUT WATER.
APPLICATION FILED AUG. 4, 1919.
1,407,752.
Patented Feb. 28, 1922.
3 SHEETS—SHEET 3.
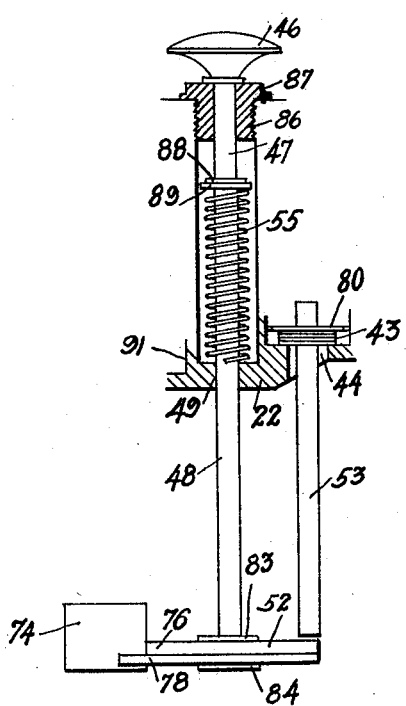
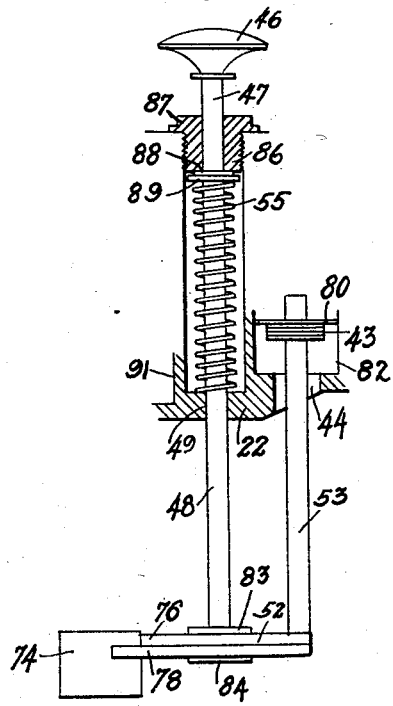
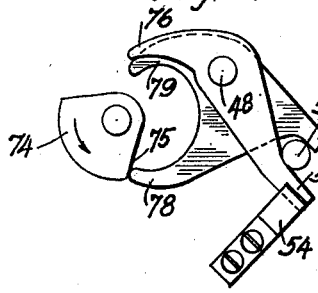
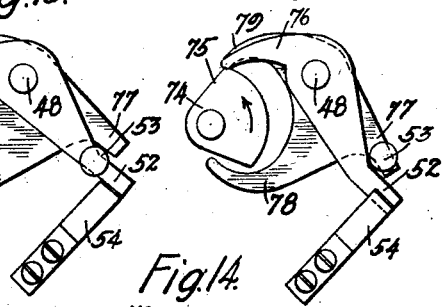
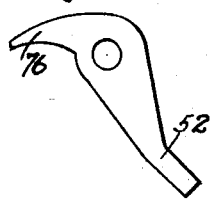
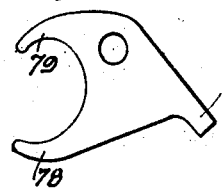
Inventor:
Stuart Otto Johns
by B. C. Stickney
Attorney

UNITED STATES PATENT OFFICE.

STUART OTTO JOHNS, OF WELLINGTON, NEW ZEALAND, ASSIGNOR TO THE NEW ZEALAND FLUSHER COMPANY LIMITED, OF WELLINGTON, NEW ZEALAND.

DEVICE FOR MEASURING OUT WATER.

1,407,752.  Specification of Letters Patent.  Patented Feb. 28, 1922.

Application filed August 4, 1919. Serial No. 315,229.

*To all whom it may concern:*

Be it known that I, STUART OTTO JOHNS, a citizen of New Zealand, and a subject of the King of Great Britain, residing in Wellington, New Zealand, have invented certain new and useful Improvements in Devices for Measuring Out Water, of which the following is a specification.

This invention relates to water-measurers, that is, devices which deliver at each operation a measured quantity of water, and is useful for a variety of purposes, as, for example, in limiting the quantity of water that is given at a single discharge from a faucet, or in measuring the quantity of water used for flushing a bowl.

One of the objects of the invention is to prevent waste of water, which is done by the employment of a simple, inexpensive, compact device, readily manufactured and easily applied.

I provide a metallic casing or housing having inlet and outlet orifices, between which is arranged a valve, the opening of which may be manually controlled, while the closing thereof may be effected automatically by the passage of water through the device. This is done by means of a wheel or its equivalent, which is rotated by the flowing water, and which drives a train of mechanism of such a character that at the conclusion of a cycle of operations, said valve is closed, thereby measuring or limiting the amount of water discharged by the device.

Another object is to render the manual controlling device easy to operate. Another is to prevent hammering of the water because of sudden closing of the valve. A further object is to render the device independent of manual control after the manual controlling device or starter has once been operated. In this way I aim to prevent loss of water which might be brought about by holding down the starting button, since it might otherwise happen that the flow would continue as long as the button was held down, thereby defeating the object of the meter.

Other objects are to render the device easy to start into action and reliable in closing, to reduce the rate of flow after nearly all of the required volume has passed through the device, so as not only to prevent hammering but also to provide for the afterfill when the device is used for flushing a bowl, to provide against irregularity and unreliability in operation due to presence of grit and particles in the water, to simplify the construction of the mechanism, particularly with a view to affording ready access to all of the parts, and otherwise to improve devices of this character.

One of the features of the invention relates to the manner of controlling the valve. This normally closes a passage which leads from the inlet to the wheel. The pressure of water normally holds said valve closed, and the valve mechanism is so constructed that, when a button is pressed, the pressure of water is relieved upon one side of a piston that controls said valve, while it is maintained upon the opposite side, whereby the valve is caused to rise or open, permitting the water to flow from the inlet to the water-wheel, to turn the same.

Said piston, which fits closely in a tubular chamber or cylinder, is subjected upon one side to constant pressure from the water-main, thus tending to open the valve. Water from the main, however, is admitted upon the opposite side of said piston, thus normally counterbalancing the pressure, so that the valve remains resting upon its seat, where it is held partly by its own weight and partly by the pressure of the water thereon; the piston normally having no effect, since the water pressure upon its opposite side is equal.

By pushing the starting button, a master valve is opened to permit escape of water from the upper side of said piston, thus relieving the pressure upon that side, so that the piston is immediately driven up by the water pressure upon the under side thereof, thus opening the valve in the main inlet passage and permitting the water to pass through to the water-wheel, and thence to discharge from the device.

At the conclusion of the cycle of operations of the water-wheel mechanism, the master valve closes, so that pressure of water above the piston is restored and hence the piston drops, and the main valve closes. The closing movement is slow, inasmuch as provision is made whereby the water above the piston is slowly restored to its normal pressure, and this provides for the afterfill of the bowl that is flushed by the water that is delivered from the meter. Moreover, the slow closing of the valve avoids hammering which would accompany a sudden closing thereof.

The master valve has proven in practice to be efficient to control the main valve, the movements of the latter being easily effected in a reliable manner, and without water hammering, by means of hydraulic action upon the piston that is connected thereto. Said master valve is normally closed, whereby maximum pressure of the water above the piston is maintained; but upon manually opening said master valve, loss or escape of water is permitted from above the piston, reducing pressure, and hence permitting the piston to be pressed up to open the main valve. Moreover, the master valve is automatically latched in open position, and so remains until the water-wheel, by means of a train of gearing and a cam driven slowly thereby, unlatches said master valve, which closes, thereby stopping the loss of water, the pressure of which is restored slowly by means of a thin stream of water which enters above the piston from the main inlet. Since the pressure above the piston is restored slowly, the main valve closes slowly and thus water hammering is avoided. There may be provided an adjustable device for regulating this flow from the main inlet to the upper side of the piston, so as to control the speed with which the main valve closes, and also to render the device adaptable for use in either high or low pressure systems.

The latch which comes into play at the operation of the button for lifting the master valve, is preferably a snap device, which is subsequently released by the slowly revolving cam connected to the water-wheel. Provision is made whereby after releasing said latch, said cam is permitted to revolve far enough to clear the latch before completing its cycle of movement; and during this final portion of the motion of the cam, the master valve is held open by means of an auxiliary latch, which is thrown into the path of the master valve stem in time to detain the same when the first latch is released, thereby holding the master valve open until the conclusion of the revolution of the cam, at which time said cam also throws out said auxiliary latch, and permits the master valve to close.

It will be seen that only the prescribed amount of water can be discharged by means of the apparatus, notwithstanding any attempt that might be made to manipulate the starting button improperly, as by holding it down, or otherwise misoperating it. If the button is pushed only part way down, the rod does not carry the latching and lifting arm beneath the valve stem, and, hence, upon releasing the button, it will return to normal position without affecting the master valve; therefore no water will be discharged. If the button is pushed all the way down and held depressed, the master valve will remain upon its seat, and no water will be discharged, because said master valve cannot be opened unless the rod rises, and the rod cannot rise unless the starting button is released. If the button is pushed all the way down and then permitted to recover only part way, the master valve will be lifted from its seat, thereby permitting a reduction of pressure in the main chamber and in the cylinder, so that the main valve will be opened by hydraulic pressure acting upon the piston, and the prescribed amount of water will flow through the device, turning the water-wheel and the train of mechanism controlled thereby, and eventually releasing the valve stem from the latch device, whereupon the master valve will close, followed by the closing of the main valve. The provision of means for preventing an overdischarge of water is a matter of importance in many communities.

By the use of a master valve, which is relatively small and easily operated, the touch upon the starting button is rendered very easy, since manual power is not employed in lifting the main valve, nor in overcoming the drag or opposition of the water in which the main valve is immersed.

One of the objects of the invention is to produce a measuring apparatus which shall be silent in operation. The water-wheel revolves noiselessly, and the train of valve mechanism preferably consists largely of worms and worm-wheels and other parts which are silent in operation.

One feature of the invention is the provision of means for preventing the valve-controlling piston from becoming sluggish or clogged by means of grit present in the water; and this is accomplished by straining or filtering the water which is supplied to the upper side of the piston.

Other features and advantages will hereinafter appear.

In the accompanying drawings.

Figure 1 is a vertical section, taken about on the line 1—1 of Figure 2, and showing parts in normal positions, with the valves closed, and water filling the main chamber as well as the inlet.

Figure 2 is a plan of the housing and some of its appurtenances.

Figure 3 is a diagrammatic plan to illustrate a convenient method for using the device for measuring out water for flushing a bowl.

Figure 4 is a sectional elevation of the apparatus, taken about at right angles to the view seen at Figure 1.

Figure 5 is a sectional plan, showing the water-wheel and its intermediate chamber in the housing of the device.

Figure 6 is a plan of the device inverted, with the bottom cover removed.

Figure 7 is a sectional elevation, to show the starting button depressed, to permit the latch to snap under the stem of the master valve.

Figure 8 is similar to Figure 7, but shows the master valve having been opened by means of the latch upon the return of the starting button to normal position.

Figures 9 to 14 are diagrams of parts seen at Figure 6; these parts being inverted and illustrating the operation of the latching arms or levers which control the movements of the master valve. Figure 9 shows the parts in normal position at the conclusion of the cycle of operations; the valve stem (shown as a circle) being indicated as free of the latch mechanism, thus indicating that the master valve is closed. Said Figure 9 is an inverted plan of the parts as seen in Figure 1. Figure 10 is an inverted plan of the parts as seen at Figure 7, the latch-carrying rod having been dropped far enough to permit the upper latch to snap under the valve stem; the parts remaining in this relation while the stem rises to the Figure 8 position. Figure 11 shows the spring latch as having been forced out by the revolving cam, while a temporary latch or dog has been swung by said cam beneath the valve stem, to prevent the valve from closing prematurely. Figure 12 is an inverted plan of the spring latch. Figure 13 is an inverted plan of the temporary latch. Figure 14 is a diagram to indicate a stage of operations between the positions at Figures 10 and 11, showing the temporary latch, which forks the cam, as having been swung by said cam partly beneath the valve stem.

The water flows into the device through an inlet 20 into a valve chamber 21, the floor 22 of which forms a partition transversely dividing the tubular housing or casing 23, which constitutes the body of the device, and which preferably is of cylindrical form. In this floor is provided a valve opening 24, through which water may descend into any suitable turbine or other form of waterwheel 25, the water thence escaping through an outlet 26, which projects from the casing 23, preferably at the opposite side from the inlet 20 and at a lower level.

The main valve 27 may be of flat or disk form, so that the pressure of water tends to hold it down upon its seat 28, and it may comprise a leather or other suitable facing 29, held on by a wide-headed screw 30, threaded into the valve.

From this valve may extend up a stem 31, which is formed upon or rigid with a piston 32, which is used in enabling the pressure of water to control the valve movements. Means will presently be described for controlling the relative pressure of water upon the upper side of the piston 32. The pressure on the under side is uniform, said under side being immersed in the water at the intake side of the device, while the pressure upon the upper side of the piston may be varied, and thus the piston 32 may be caused to move up and down, together with the valve 27.

The piston works in a vertical cylinder 33 which may be integral with the main casing or housing 23, and water may be admitted into said cylinder and above the piston 32 through a small inlet 34, Figure 1, leading from the upper side of the main inlet. The water passes from this inlet 34 up through a duct or channel 35 formed in the side of a screw 36, and fills the upper chamber 37 of the housing, that is, all that part of the housing which is above the main floor 22. The cylinder 33, which contains the piston 32 is in the form of a well within said upper chamber 37; and the water which passes up through the constricted inlet 35 in the screw 36, slowly fills said chamber and overflows into said well to fill the same. It will be noted that the housing is closed at its upper end by a removable disk or lid 38, which is held on by means of an annular threaded clamp 39 which screws onto the threaded rim 40 of the housing; said annular clamp having a flange 41 to hold said rim down upon the top edge or brim of the housing. A gasket 42 between the lid and brim leaves a water space above the cylinder 33, to permit the latter to fill with water. The piston 32 is preferably made hollow, as illustrated, for economy of material, and to avoid unduly weighting the apparatus.

Normally the pressure of water above the piston 32 is equalled by that below the piston, and hence the valve 27 remains upon its seat, since the tendency of the water is to press the valve down, and this tendency is aided by the weight of the valve itself; but provision is made for temporarily reducing the pressure of water above the piston 32, so as to cause the latter to be lifted by the pressure of water which is maintained upon the under side of the piston. This pressure-reducing means comprises a master valve 43 which may be opened to let water escape from the main chamber 45, thereby reducing the pressure in said chamber and also in said cylinder 33, said master valve normally closing a small outlet 44 leading from said chamber to the main outlet 26.

This master valve 43 is under the control of a finger-piece or manually operable device in the form of a button 46 which rises from the lid or cover 38, and is provided with a stem 47 to press down a rod 48 which extends down through a guide-hole 49 in the floor 22 and down through the water-wheel chamber 50, and also down through the floor 51 of said water-wheel chamber 50 and carries at its lower end a valve lifting arm 52. This arm 52 is carried bodily down by the stem or rod 48 far enough to snap under the lower end of a vertical stem 53 that is provided upon the master valve 43. A spring 54 may be used to swing the arm 52 beneath the stem 53; or a pivoted weight may be substituted.

When pressure upon the button 46 is released, a spring 55 may lift said rod 48 together with the arm 52, the latter carrying up the stem 53 and the master valve 43. This holds the valve open, since the arm 52 serves as a latch to latch the stem 53 in its elevated position. Water wastes or flows out past said open valve 43, which is of relatively large capacity, more easily than it flows into the main chamber 45 through the restricted passage 35, thereby reducing the water pressure in said chamber 45 and in the cylinder 33 which contains the piston 32, so that the latter is forced up, lifting the main valve from its seat and permitting water to flow through the valve opening 24, into the turbine or water wheel 25, turning the same, and flowing to the outlet 26.

The difference in pressure above and below the piston may be controlled or regulated to a certain extent by adjusting the screw 36 up and down, thereby increasing or diminishing the top opening at the inlet passage 35 which may be formed in one or both sides of said screw, and which may have diverging sides as shown, to increase the range of adjustment or flow. Preferably a strainer 56 is provided in the inlet, so that no dirt can pass into the main chamber 45 and interfere with the closing of the master valve 43, or with the operation of the piston 32. It will be noted that said screw 36 may be threaded through the cap or top portion of a hollow screw plug 57, which is threaded through the upper part of the inlet 34 and clamps down the disk-like strainer or filter 56 upon its seat 58.

While the master valve 43 is being held open by the arm or latch 52, the wheel 25 is rotated by the water flowing from the main inlet 20 through the valve opening 24 to the main outlet 26, and, by means of a worm 60 which is provided upon the lower end of the wheel shaft 61, drives a worm-wheel 62.

It will be noted that the water wheel occupies a separate chamber 50 in the device, the top of said chamber being the partition 22, and the floor of said chamber being the second partition 51, which entirely crosses the housing, thus dividing off a bottom chamber 63 in which is contained the remainder of the mechanism of the meter. This bottom chamber 63 may be provided with a cup-like closure 64, having a threaded flange 65 which screws onto the bottom of the housing or casing 23; a gasket 66 being provided to render the same water-tight. This bottom chamber may be filled with grease or other lubricant for the working parts. In order to render the water wheel 25 accessible or removable, the partition 51 is formed mainly of a circular disk 67 having a threaded edge 68 which screws up into a seat 69 provided in said partition, thereby closing the same, while being bodily removable to withdraw the water wheel from the apparatus; said shaft 61 being journaled in said disk, and the water wheel having a hub or step 70 which bears upon the disk.

The water wheel worm 60 drives the worm wheel 62, which in turn is connected by means of a shaft 71 to a second worm 72 in mesh with a second worm wheel 73, which is given a single revolution at each measuring operation of the meter. This worm wheel 73 is provided with a cam device 74 for controlling the release of the arm 52 which latches up the stem 53 of the master valve 43 and therefore keeps the latter open. The loss of water through this valve is slight, as it is substantially limited to the amount that can enter chamber 45 through the constricted passage 35.

The swinging movement of arm 52, about its pivot 48, to withdraw it from its condition of supporting the master valve stem 53, is effected when a face 75 of the cam 74 swings aside a projection or extension 76 upon the arm 52, and thereby swings said arm back to its normal position, releasing it from the stem 53. At this moment said stem, however, is intercepted by a lower supporting arm 77, so that the master valve 43 remains open. This intercepting arm or dog, or latch 77 has forks 78, 79, embracing the cam 74, face 75 of which engages arm 78 and swings said arm 77 into intercepting position while the valve stem 53 is being held up by arm or latch 52. Through the described train of wheel-driven gearing the cam continues to revolve towards the left or counter-clockwise until the edge 75 of the cam engages fork 79 and swings arm 78 from the position at Figure 11 in counter-clockwise direction to the position at Figure 9, thereby withdrawing the arm 77 from stem 53 and permitting the latter to fall to normal position, with the master valve 43 carried by said stem, thus stopping the slow loss of water from the main chamber 45. At this time the chamber is filled to the top, since it is air-tight and since not much more water has escaped through 43 than has entered through 35. By reason of the communication between said main chamber 45 and the main inlet 20, which is afforded through the slotted screw, water slowly presses into said chamber 45, until the pressure in said chamber and in the cylinder 33 is increased to a point equalling the pressure in the inlet main 20, and hence the main valve 27 falls, closing the opening 24, and remains closed, partly by its own weight and partly by pressure of water thereupon. The valve may comprise a metal cap 80, having lateral guiding projections 81 to engage the wall of a sunken cylindrical well 82 provided in the main chamber 45. A weak returning spring 82$^a$ may be provided for valve 43.

It will be understood that the swinging movements of the three-arm latch-lever 77, 78, 79, are controlled by the revolving cam, and that those of the two arm latch-lever 52, 76 are controlled partly by said cam and partly by the spring 54. Both levers are pivoted upon the lower end of the rod 48, said levers being confined between collars 83, 84 provided upon said rod. A sleeve 85 is provided between the upper collar and the bottom of the partition 51, to limit the upward movement of the rod and its accessories; and the cam is made of sufficient height to accommodate the up-and-down shifting movements of the levers for latching under and raising the master valve stem 53.

The spring 55 which returns the rod 48 also lifts the button 46 to normal position; the stem 47 of said button extending down through a screw plug 86, the latter having a part 87 fitted to receive a wrench, and also having a cap portion to clamp down upon the lid. The bottom of the stem 47 has a head 88 whereby it is confined in the screw plug, said head being adapted to engage a head 89 which is provided upon the top of the rod 48. It will be noted that the button and detachable lid form a unit, as the button will come off with the lid, thus conducing to simplicity and celerity of inspection and cleaning. A gasket 90 may be interposed between the lid and a tubular container 91 provided for the rod and its spring. The latter is compressed between head 89 and the bottom of the container, which may be integral with the floor of the main chamber 45. Said floor has a guiding perforation 49 in which said rod fits closely; the second floor having a similar guiding perforation 93 for said rod.

It is noted that the wheel 25 is formed of a circular series of buckets, consisting of radial curved blades 94 rising from a floor 95, and has the function of measuring out the water that flows from the inlet 20 to the outlet 26. It is placed directly under the valve opening 24, so as to receive all of the water flowing down through said opening, and it is of much larger diameter than the opening, so that the wheel may be depended upon to measure out the water with substantial accuracy, regardless of the rate of flow and independently of the pressure of the water. The device may be used with both high-pressure and low-pressure water systems, and in all cases measures out the predetermined quantity of water, whether the same flows slowly or rapidly through the device, thus practically eliminating waste. It is believed to be novel to provide a valve mechanism, faucet or device for measuring out water supplied through a city water main, by the use of a wheel which measures the water with reasonable accuracy under all conditions, and which closes the valve as soon as the predetermined quantity of water has passed through the device.

Variations may be resorted to within the scope of the invention, and portions of the improvements may be used without others.

Having thus described my invention, I claim:

1. A device for measuring out water, comprising a casing having an inlet and outlet and an intermediate valve, manually operable means for varying pressure of water within said casing in a manner to cause said valve to open, a wheel driven by water passing through said valve, and means controlled by said wheel for restoring the normal pressure of water, and thereby causing said valve to close.

2. A device for measuring out water, comprising a casing having an inlet and outlet and an intermediate valve, manually operable means for varying pressure of water within said casing in a manner to cause said valve to open, a wheel driven by water passing through said valve, and means controlled by said wheel for restoring the normal pressure of water, and thereby causing said valve to close, said pressure-restoring means including a constricted passage through which water flows slowly from the main inlet to restore pressure to normal condition, whereby said valve is caused to close slowly for the purposes specified.

3. A device for measuring out water, comprising an inlet and outlet and an intervening main valve which is normally held closed by the pressure of water, a master valve normally closed, means for opening said master valve, means whereby the opening of said master valve varies the pressure of water in a manner to open the main valve, a wheel operated by water flowing through said main valve, and mechanism connecting said wheel to said master valve to control the closing of the latter.

4. The combination of a housing or casing having an inlet, an outlet and an intervening main valve, and comprising a chamber provided with a master valve, means for opening said master valve, means for enabling the flow of water through said main valve to control the closing of said master valve, to prevent the escape of water through said chamber, said controlling means including a wheel operated by the water flowing through said main valve, a cam mechanism operated by said wheel and controlling said master valve, a constricted passage being provided between said inlet and said chamber, to permit the restoration of normal pressure in said chamber; and means to enable the movements of the main valve to be controlled by pressure of water in said chamber and said inlet.

5. The combination of a housing or casing having an inlet, an outlet and an intervening main valve, and comprising a chamber provided with a master valve, a manually operable device for opening said master valve, means for enabling the flow of water through said main valve to control the closing of said master valve, to prevent the escape of water through said chamber, said controlling means including a wheel operated by the water flowing through said main valve, a cam mechanism operated by said wheel and controlling said master valve, a constricted passage being provided between said inlet and said chamber, to permit the restoration of normal pressure in said chamber; means to enable the movements of the main valve to be controlled by pressure of water in said chamber and said inlet, said cam mechanism including a latch device brought into use by said manually operable device for latching said master valve in open position, and means controlled by the cam for releasing said master valve from the control of said latch device.

6. The combination of a housing or casing having an inlet, an outlet and an intervening main valve, and comprising a chamber provided with a master valve, a manually operable device for opening said master valve, means for enabling the flow of water through said main valve to control the closing of said master valve, to prevent the escape of water through said chamber, said controlling means including a wheel operated by the water flowing through said main valve, a cam mechanism operated by said wheel and controlling said master valve, a constricted passage being provided between said inlet and said chamber, to permit the restoration of normal pressure in said chamber; means to enable the movements of the main valve to be controlled by pressure of water in said chamber and said inlet, said cam mechanism including a latch device brought into use by said manually operable device for latching said master valve in open position, means controlled by the cam for releasing said master valve from the control of said latch device, said latch device comprising a snap latch which is brought into use at the operation of said manually operable device, and which retains the master valve in open position, a cam which releases said latch, and an auxiliary latch movable by said cam first into position to prevent said master valve from closing, and finally into position to release said master valve at the conclusion of the cycle of operations of said cam mechanism.

7. The combination of a casing having an inlet and outlet and an intervening valve, a piston to control said valve, means for admitting water to both sides of said piston in a manner to equalize the pressure thereon, a finger-piece, means controlled by said finger-piece for reducing the pressure upon one side of said piston, to cause a movement thereof by reason of the unbalanced condition of the pressure thereon, a connection between said piston and said valve, and water-measuring mechanism controlled by the water flowing past said valve for restoring the equilibrium of pressure upon said piston to effect a closing of the valve upon the discharge of a measured quantity of water, said measuring mechanism including a water-wheel.

8. The combination with a casing having an inlet and an outlet and an intermediate main valve, of a piston connected to said valve, a chamber in communication with said inlet to be filled with water therefrom, a relatively constricted passage being provided between said chamber and said inlet, said piston being subjected on one side to the pressure of water in said chamber, and on the other side to the pressure of water in said inlet, a master valve normally closed, means to open said master valve to permit escape of water from said chamber to reduce the pressure upon one side of said piston, whereby the piston is moved and the main valve is opened, and water measuring mechanism actuated by the water flowing through said main valve to control the closing of said master valve upon the discharge of a measured quantity of water, said measuring mechanism including a water-wheel.

9. The combination with a casing having an inlet and an outlet and an intermediate main valve, of a piston connected to said valve, a chamber in communication with said inlet to be filled with water therefrom, a relatively constricted passage being provided between said chamber and said inlet, said piston being subjected on one side to the pressure of water in said chamber, and on the other side to the pressure of water in said inlet, a master valve normally closed, means to open said master valve to permit escape of water from said chamber to reduce the pressure upon one side of said piston, whereby the piston is moved and the main valve is opened, and means actuated by the water flowing through said main valve to control the closing of said master valve, said controlling means including a water-wheel and a mechanism controlled thereby for controlling said master valve.

10. The combination with a casing having an inlet and an outlet and an intermediate main valve, of a piston connected to said valve, a chamber in communication with said inlet to be filled with water therefrom, a relatively constricted passage being provided between said chamber and said inlet, said piston being subjected on one side to the pressure of water in said chamber, and on the other side to the pressure of water in said inlet, a master valve normally closed, means to open said master valve to permit escape of water from said chamber to reduce the pressure upon one side of said piston, whereby the piston is moved and the main valve is opened, and means actuated by the water flowing through said main valve to control the closing of said master valve, said controlling means including a water-wheel and a mechanism controlled thereby for controlling said master valve, a latching device being provided for holding said master valve open, and mechanism being controlled by said water-wheel for releasing said master valve for a closing movement.

11. The combination of a casing provided with an inlet and outlet and an intervening main valve, a piston connected to said valve, a chamber provided in said casing, a cylinder in which said piston works, said cylinder arranged within said chamber and in communication therewith, a constricted passage being provided between said chamber and said inlet, a pressure-controlling master valve in said chamber, means for opening said master valve, to reduce the pressure of water in said chamber and cylinder, thereby to cause a movement of the piston to open the main valve, and water measuring mechanism operable by the water flowing through the main valve to control the closing of the master valve upon the discharge of a measured quantity of water, said measuring mechanism including a water-wheel.

12. In a device for measuring out water, the combination with a valve and a piston connected thereto to be subjected to the pressure of water upon opposite sides thereof, of means controlled by a finger-piece for varying the pressure upon one side of the piston, to permit the piston to be moved and the valve to be opened by the pressure of water, and water measuring mechanism including a water-wheel operated by the water flowing through the apparatus, and means controlled by said water-wheel for restoring the pressure of water upon the piston to close said valve upon the discharge of a measured quantity of water.

13. In a device for measuring out water, the combination with a main valve, of hydraulic means for opening and closing said valve, manually controlled means for effecting the hydraulic opening of said valve, means controlled by the flow of water through the apparatus for hydraulically effecting the closing of said valve, including a water-wheel operated by the water, and a single-revolution cam or device connected by movement-reducing gearing to said water-wheel.

14. In combination, a housing having an inlet, an outlet, and a main chamber, a main valve, normally closing said inlet, a piston connected to said valve and exposed to pressure of the water from said inlet, a cylinder in which said piston works, said cylinder open to said main chamber, a constricted passage being provided between said inlet and said main chamber, a master valve normally closing an opening between said main chamber and said outlet, a stem carrying said master valve, both said master valve and said main valve normally closed, by reason of the equilibrium in pressure of water above and below said piston, a starting button or part, a rod movable endwise by said button, a latch carried by said rod, means to move said latch beneath said valve stem, a spring to lift said rod together with said latch, said stem and said master valve, whereby water is permitted to escape from said main chamber, to reduce the pressure of water above said piston, and permit the pressure of water in said inlet to raise said piston and main valve, a water-wheel to be operated by water flowing from said inlet to said outlet, and means controlled by said water-wheel to release said valve stem, to permit the master valve to be closed by the water in said main chamber, whereby the pressure of water in the main chamber is increased to normal, and the piston is slowly forced down by the pressure of water in the piston chamber and in the main inlet passage.

15. In combination, a housing divided by partitions into upper, intermediate and lower chambers, and having a main inlet passage to said intermediate chamber and a main outlet passage from said intermediate chamber, a valve in said main inlet passage, a piston connected to said valve and exposed to the pressure of water in said main inlet passage, a cylinder in which said piston works, said cylinder open to said upper chamber, a constricted passage being provided between said inlet passage and said upper chamber, a master valve normally closing an opening between said upper chamber and said main outlet, a stem carrying said master valve, both said master valve and said main valve normally closed, by reason of the equilibrium in pressure of water above and below said piston, a starting button, a rod movable by said button, a latch carried by said rod to a position below the end of said master valve stem, means to move said latch beneath said valve stem, a spring to lift said rod together with said latch, said stem and said master valve, whereby water is permitted to escape from said upper chamber into said main outlet, to reduce the pressure of water above said piston, and permit the pressure of water in said main inlet to raise said piston and main valve, a water-wheel in said intermediate chamber to be operated by water flowing from said main inlet through said chamber to said main outlet, a cam in said lower chamber and connected to said water-wheel, means to enable said cam to release said valve stem, and a second latch having a fork embracing said cam, and moved thereby into position to intercept said valve stem, said cam operating to disengage said second latch from said valve stem, to permit the master valve to be closed by the water in said upper chamber, whereby the pressure of water in the upper chamber is increased to normal, and the piston is slowly forced down by the pressure of water in the piston chamber and in the main inlet passage at a rate controlled by the flow of water up through said constricted passage from the main inlet passage to the upper chamber, until the main valve closes.

16. The combination with a housing having an inlet and outlet and an intermediate valve, of means for opening the valve, and means, including a water-wheel, for closing the valve, said closing means including a hydraulic device provided with means for effecting slow movement of the valve.

17. The combination with a housing having an inlet and outlet and an intermediate valve, of means for opening the valve, and means, including a water-wheel, for closing the valve, said closing means including a hydraulic device provided with a constricted water passage to delay or prolong the operation of said hydraulic device.

18. The combination with a housing having an inlet and outlet and an intermediate valve, of means for opening the valve, and means, including a water-wheel, for closing the valve, said closing means including a hydraulic device provided with a constricted water passage to delay or prolong the operation of said hydraulic device, means being provided for regulating the flow of water through said constricted passage.

19. The combination of a housing having an inlet and an outlet and an intermediate valve, a piston to operate said valve, said housing having a cylinder in which said piston works, a constricted passage being provided between said inlet and said cylinder, a manually operable valve for permitting water to escape sufficiently to reduce the pressure above said piston while pressure is maintained below the piston, means to latch said manually operable valve in open position, and water-wheel mechanism operated by the water flowing through the housing for releasing the latch and closing said valve.

20. The combination of a housing having an inlet and an outlet and an intermediate main valve, a finger-piece, a rod movable by said finger-piece, an arm carried by said rod, a master valve having a stem, means for causing said arm to engage said stem, a spring to lift said rod, arm and stem, a chamber opened by said master valve, said chamber having a constricted passage from said inlet, a cylinder in communication with said chamber, a piston in said cylinder and connected to said main valve and exposed upon one side to the pressure of water in said inlet, and means operated by the flow of the water through the device for releasing the master valve for a closing operation.

21. The combination of a housing having an inlet and an outlet and an intermediate main valve, a finger-piece, a rod movable by said finger-piece, an arm carried by said rod, a master valve having a stem, means for causing said arm to engage said stem, a spring to lift said rod, arm and stem, a chamber opened by said master valve, said chamber having a constricted passage from said inlet, a cylinder in communication with said chamber, a piston in said cylinder and connected to said main valve and exposed upon one side to the pressure of water in said inlet, and means operated by the flow of the water through the device for releasing the master valve for a closing operation, said constricted passage being formed in a screw which is threaded through a plug closing an opening between said chamber and said inlet.

22. The combination of a housing having an inlet and an outlet and an intermediate main valve, a finger-piece, a rod movable by said finger-piece, an arm carried by said rod, a master valve having a stem, means for causing said arm to engage said stem, a spring to lift said rod, arm and stem, a chamber opened by said master valve, said chamber having a constricted passage from said inlet, a cylinder in communication with said chamber, a piston in said cylinder and connected to said main valve and exposed upon one side to the pressure of water in said inlet, and means operated by the flow of the water through the device for releasing the master valve for a closing operation, said constricted passage being formed in a screw which is threaded through a plug closing an opening between said chamber and said inlet, said plug being threaded into said opening, and a strainer or filter being retained in said opening by said plug.

23. In combination, a housing having a main chamber, an inlet, a lower chamber and an intermediate chamber, a valve between said inlet and said intermediate chamber, a water-wheel in said intermediate chamber, a starting button or finger-piece, a rod extending from said finger-piece into said lower chamber, an arm carried by said rod, a master valve in said upper chamber having a stem extending to said lower chamber, to be engaged and lifted by said arm, a cylinder in said upper chamber, a piston in said cylinder to be pressed down by the water in said upper chamber, and to be pressed up by the water in said inlet, a constricted passage being provided from said inlet to said main chamber, and means to release said master valve stem for a closing operation.

24. In combination, a housing having a main chamber, an inlet, a lower chamber and an intermediate chamber, a valve between said inlet and said intermediate chamber, a starting button or finger-piece, a rod extending from said finger-piece into said lower chamber, an arm carried by said rod, a master valve in said upper chamber having a stem extending to said lower chamber, to be engaged and lifted by said arm, a cylinder in said upper chamber, a piston in said cylinder to be pressed down by the water in said upper chamber, and to be pressed up by the water in said inlet, a constricted passage being provided from said inlet to said main chamber, and means to release said master valve stem for a closing operation, said upper chamber being provided with a lid, and an annular threaded flange to retain the same; said finger-piece being mounted upon said lid to form therewith a detachable unit; and said bottom chamber being closed by a screw-cap.

25. In combination, a housing having a main chamber, an inlet, a lower chamber and an intermediate chamber, a valve between said inlet and said intermediate chamber, a starting button or finger-piece, a rod extending from said finger-piece into said lower chamber, an arm carried by said rod, a master valve in said upper chamber having a stem extending to said lower chamber, to be engaged and lifted by said arm, a cylinder in said upper chamber, a piston in said cylinder to be pressed down by the water in said upper chamber, and to be pressed up by the water in said inlet, a constricted passage being provided from said inlet to said main chamber, and means to release said master valve stem for a closing operation, said upper chamber being provided with a lid, and an annular threaded flange to retain the same; said finger-piece being mounted upon said lid to form therewith a detachable unit; and said bottom chamber being closed by a screw-cap, said intermediate and lower chambers being divided by a partition, a disk being threaded into an opening in the partition, and a water-wheel being mounted upon said disk to permit withdrawal of the disk and water-wheel.

26. The combination with a housing having an inlet and outlet, of a plurality of valves, the first of which is arranged between said inlet and said outlet, a finger-piece connected to the second valve to open it, means for enabling the second valve to control the operation of the first valve, and water-wheel mechanism dependent upon the quantity of liquid passing through the device, for controlling the operation of the second valve in closing the first valve.

27. The combination of a housing having an inlet and outlet and an intermediate valve, a wheel operable by water flowing through the valve, and a train of mechanism driven by the wheel of such a character that at the conclusion of a cycle of operations, the valve is closed to measure or limit the amount of water discharged from the outlet, a finger-piece being provided for controlling the opening of said valve, and said train of mechanism including means for closing said valve independently of said finger-piece.

28. A device of the character described, comprising, in combination, a valve, a starting button or member, means controlled by the starting button for effecting the opening of the valve, and means including a water-wheel for automatically closing the valve independently of the starting button, so that the button cannot maintain the valve in open position.

STUART OTTO JOHNS.

Witnesses:
EDITH B. LIBBEY,
CATHERINE A. NEWELL.